United States Patent [19]

Sheeley et al.

[11] 4,035,228

[45] July 12, 1977

[54] RECOVERY PROCESS AND APPARATUS FOR ALKALI METAL-CONTAINING WASTE LIQUOR

[75] Inventors: Donald R. Sheeley; James H. Rion, both of Hartsville, S.C.

[73] Assignee: Sonoco Products Company, Hartsville, S.C.

[21] Appl. No.: 663,612

[22] Filed: Mar. 3, 1976

[51] Int. Cl.² .............. D21C 11/02; D21C 11/12
[52] U.S. Cl. ........................... 162/30 R; 23/262; 162/36; 162/240; 210/46; 423/182; 423/207
[58] Field of Search .............. 162/30 R, 30 K, 36, 162/239, 240; 423/207, 121, 127, 129, 182, 183; 210/46; 23/262

[56] References Cited

U.S. PATENT DOCUMENTS

| | | | |
|---|---|---|---|
| 2,141,132 | 12/1938 | Folger | 423/127 |
| 2,356,626 | 8/1944 | Seailles | 423/127 |
| 2,574,008 | 11/1951 | Beja | 423/121 |
| 3,652,208 | 3/1972 | Burk et al. | 423/127 |
| 3,787,283 | 1/1974 | Sheeley et al. | 162/36 |

Primary Examiner—S. Leon Bashore
Assistant Examiner—Peter F. Kratz
Attorney, Agent, or Firm—Bell, Seltzer, Park & Gibson

[57] ABSTRACT

A process and apparatus for treating concentrated alkali metal-containing waste liquor to recover the alkali metal content for reuse includes the following steps and apparatus. Concentrated alkali metal-containing waste liquor is mixed with recycled alumina and formed into solid pellets by mixing the concentrated liquor-alumina mixture with recycled alkali metal aluminate furnace ash. The solid pellets are fed through a furnace operating at a temperature below the fusion temperature of the aluminate for combusting the organic portion of the pellets and reacting the alkali metal content thereof with the alumina to form additional alkali metal aluminate ash. A portion of the furnace ash is recycled for reuse in the formation of pellets, while another portion of the ash is dissolved in water to form a solution of alkali metal aluminate. The alkali metal aluminate solution is mixed with slurry recycled from later in the process to initiate limited precipitation of alumina from the alkali metal aluminate. The mixture is then reacted with acidic oxide gas to effect additional precipitation of alumina and produce a slurry of the alumina in a solution containing the alkali metal. The alumina is separated for reuse in the treating process and the alkali metal-containing solution is recovered.

12 Claims, 4 Drawing Figures

RECOVERY PROCESS AND APPARATUS FOR ALKALI METAL-CONTAINING WASTE LIQUOR

This invention relates to an improved process and apparatus for treatment of waste liquor and more particularly to a process and apparatus for treating alkali metal-containing waste liquor to recover the alkali metal content thereof for reuse. The process and apparatus is particularly suited for treating concentrated spent liquor from sodium or potassium-base pulping process to recover the sodium or potassium for reuse in the pulping process.

In prior practices of sodium recovery from spent liquor, as employed in pulping operations for example, the dilute spent liquor generally is concentrated by evaporation and then burned in a Kraft-type furnace to produce a smelt composed of a mixture of principally sodium carbonate and sodium sulfide. The smelt is subsequently processed by several means to recover the sodium as sodium sulfite either with or without the recovery of sulfur. Examples of processes which recover sodium and sulfur as sodium sulfite from Kraft-type furnace smelts are set forth in U.S. Pat. Nos. 2,792,350; 2,862,887; 2,864,669; 2,849,292; and 3,061,408.

In commonly owned U.S. Pat. No. 3,787,283 issued Jan. 22, 1974, there is disclosed a process and apparatus for recovering the sodium from sodium-based spent pulping liquors in which the concentrated spent liquor is combusted in the form of solid pellets rather than as a sticky molten smelt. As is set forth in the introductory portion of this patent, this recovery process has numerous advantages over the above-noted prior conventional recovery processes. For example, the process can be carried out with relatively inexpensive furnace equipment such as a rotary kiln rather than the more expensive Kraft or glass furnaces which are required to handle a molten smelt. Further, the sodium is recovered directly as sodium sulfite, whereas in most of the prior practices employing Kraft type furnaces, the smelt obtained therefrom is a mixture of principally sodium carbonate and sodium sulfide which must thereafter be processed by several means to recover the sodium as sodium sulfite.

The recovery process and apparatus of the above-noted, commonly owned prior U.S. Patent involves mixing concentrated spent liquor containing sodium from a sodium based pulping process with recycled finely divided alumina hydrate in an amount necessary to react with the sodium content of the liquor for ultimate formation of sodium aluminate as the reaction product. Solid pellets are formed from the concentrated liquor-alumina hydrate mixture in a rotating enclosed tumbling apparatus carrying a bed of recycled sodium aluminate furnace ash in the bottom thereof by spraying the concentrated liquor-alumina hydrate mixture onto the bed of ash so that as the tumbling means rotates, solid pellets will be formed. The thus formed solid pellets are combusted and reacted by feeding the pellets through a furnace operating at a temperature below the fusion temperature of sodium aluminate and at a sufficiently high temperature to combust the organic portion of the pellets and react the sodium content thereof with the alumina to form additional sodium aluminate as a particulate unfused ash. The furnace ash is pulverized and a portion thereof is recycled for subsequent reuse in the treatment process. The remaining portion of the ash is dissolved in water to form a solution of sodium aluminate. The sodium aluminate solution in one instance is reacted with sulfur dioxide to form alumina hydrate as a precipitate in a solution containing sodium sulfite. The insoluble alumina hydrate is separated by filtration for reuse in the treating process and the sodium sulfite for reuse in the pulping operation.

In accordance with the method and apparatus described in the above-noted prior patent, the sodium aluminate solution is reacted with sulfur dioxide by directing sulfur dioxide gases through an absorber while contacting the sodium aluminate solution directly with the sulfur dioxide gases in the absorber.

In carrying out this process on a commercial scale, it was found that when the sulfur dioxide is allowed to react directly with the sodium aluminate solution, the precipitated alumina is of such a form and size that the rate of filtration is undesirably slow for practical and economical commerical operation. More particularly, a considerable amount of the alumina is precipitated in a very small particle size or as a slimy gelatinous mass which is very slow to filter. These conditions also cause a build-up of insoluble alumina within the absorber such that after a period of continued operation the flow of gases and liquid through the absorber is seriously impeded or completely stopped. This fouling of the absorber necessitates periodically stopping the recovery process to clean the absorber.

With the foregoing in mind, it is an object of this invention to overcome the above problems and to improve the above described recovery process and apparatus, making the same more practical and efficient for commercial operation.

More particularly, it is an important object of this invention to provide an improved recovery process and apparatus of the type described wherein the alumina is precipitated in a particulate form which may be easily and quickly filtered and which will pass through the absorber without fouling the same.

In accordance with the present invention, it was determined that the undesirable difficult-to-filter form of alumina resulted from allowing the sulfur dioxide-containing flue gases to react directly with the soluble sodium aluminate such that a very rapid precipitation of alumina occurs. It was found that when the precipitation of alumina is caused to progress at a slower rate, the particle size of the insoluble alumina formed is such as to provide much quicker and more efficient separation, by filtration or other means.

The present treatment process and apparatus of the present invention provides for controlling the rate at which precipitation of alumina occurs and thereby results in obtaining the alumina in larger, easily filterable particulate form.

This improved treatment process is applicable not only to sodium-base spent liquors but to other alkali metal base spent liquors as well, such as potassium-base liquors, for example. This process and apparatus, while being particularly suited for treating waste liquors from pulping processes, is also applicable to the treatment of alkali metal-containing waste liquors from numerous other operations wherein it is desired to recover for reuse the alkali metal content of the waste liquor. In chemical industries having a waste stream of sodium or potassium salts of organic acids for example, the recovery process of this invention may be advantageously employed for the disposal of the organic acids and recovery of sodium or potassium. The present process is also useful in a variety of applications where it is desired to convert sodium sulfate to sodium sulfite.

The improved manner and means for precipitating alumina in accordance with the present invention may be summarized as follows: The alkali metal aluminate, after being dissolved to form a solution thereof and prior to being introduced into the absorber, is mixed in a precipitator tank with recycled slurry from the base of the absorber to initiate limited precipitation of alumina from the alkali metal aluminate. The mixture of slurry and alkali metal aluminate from the precipitator tank is thereafter reacted with an acidic oxide gas (such as sulfur dioxide, carbon dioxide, or a mixture of sulfur dioxide and carbon dioxide) in the absorber to allow the precipitation of alumina to progress to completion and thereby produce a slurry of the insoluble alumina in an easily filterable particulate form in a solution containing the alkali metal (as alkali metal sulfite, alkali metal carbonate).

In reacting the mixture of slurry and alkali metal aluminate from the precipitator tank with the acidic oxide gas, the mixture is first directed onto the base of the absorber and mixed with slurry already present therein where the precipitation of alumina progresses further. At the same time, slurry is continuously withdrawn from the base of the absorber and directed to the upper portion of the absorber where it is contacted with the acidic oxide gases passing therethrough. The alkali metal aluminate still present in the slurry reacts with and absorbs the sulfur dioxide and/or carbon dioxide from the gas stream to form alkali metal sulfite and/or carbonate and to further precipitate alumina in an easily filterable particulate form. These materials are thereafter returned to the base of the absorber to be mixed with the slurry already present in the base of the absorber.

The slurry is recirculated through the absorber and into contact with the gases at a relatively high rate, which is substantially greater than the rate at which the reactant mixture is introduced into the absorber from the precipitator tank, or the rate at which the slurry is withdrawn for filtration. This, together with the provision of additional agitation in the base of the absorber, insures good mixing and homogeneity of the slurry.

As previously noted, some of the slurry from the base of the absorber is recycled to the precipitator tank to be mixed with the alkali metal aluminate solution so that limited precipitation of alumina is initiated in the precipitator tank. This limited precipitation is maintained at the desired level when the slurry is mixed with the sodium aluminate solution in the precipitator tank at a ratio of about 1 to 4 parts slurry to 1 part sodium aluminate solution. The recycling of slurry from the base of the absorber into the precipitator tank in this manner provides a reduction in the pH of the alkali metal aluminate solution prior to reaction with the acidic oxide gases. It additionally provides previously precipitated alumina particles in the precipitator tank to serve as nucleation sites or "seeds" for facilitating initiating the precipitation of alumina from the alkali metal aluminate solution in the desired easy to filter particulate form.

Some of the objects and advantages of this invention having been stated, other objects and advantages will appear as the description proceeds, when taken in conjunction with the accompanying drawings in which.

Figure 1:
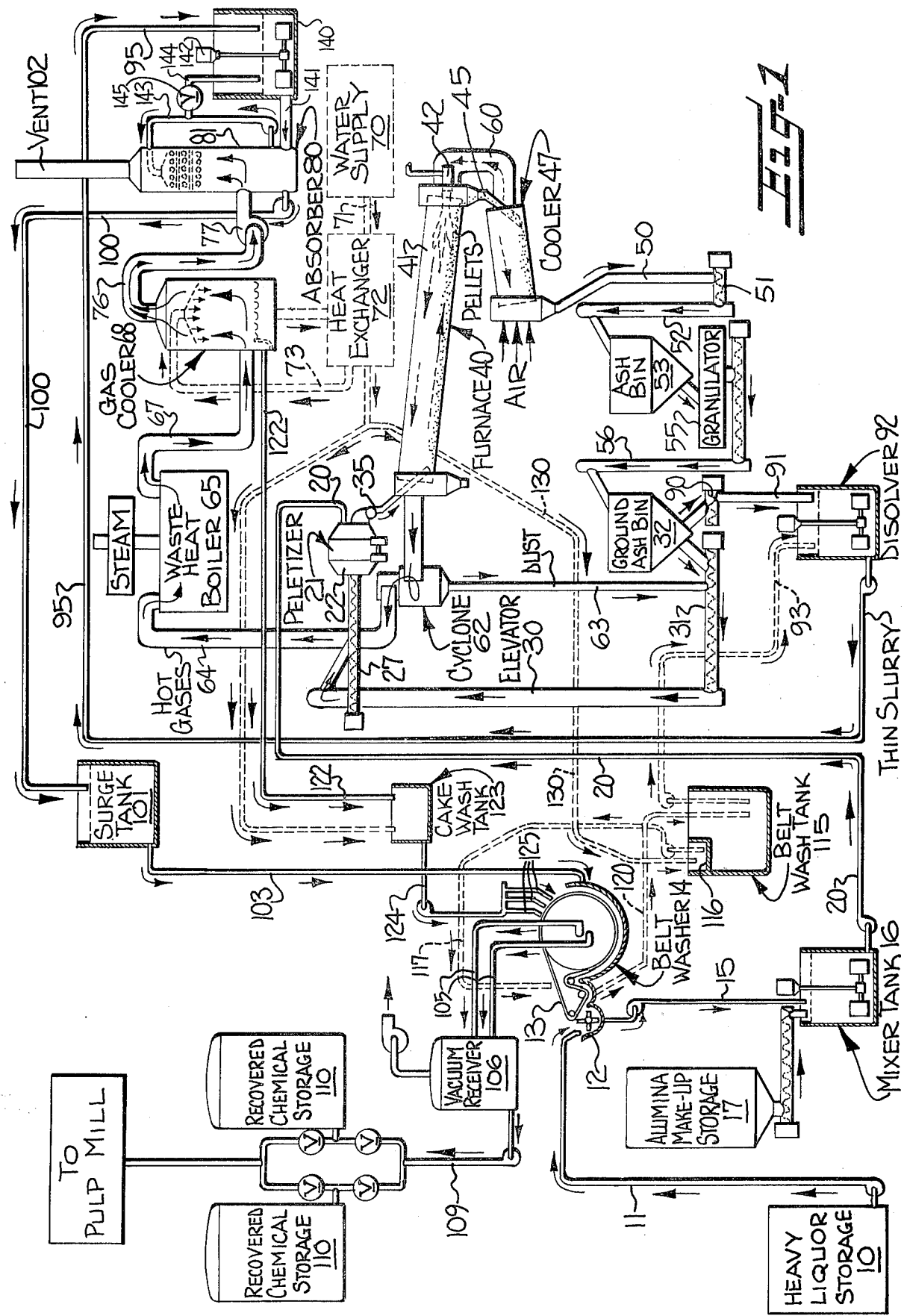
FIG. 1 is a schematic, diagrammatic flow diagram of the process and apparatus of this invention.

Referring now to the drawings, the following is a general description of the process and apparatus of this invention as applied to the treatment of spent liquor from a sodium based pulping operation or pulp plant. The treatment process and apparatus of this invention may also be applied to the treatment of other alkali metal-base spent liquors, such as potassium, as will be evident from the specific examples which follow this general description.

Dilute waste liquor containing an alkali metal such as sodium is concentrated in multiple effect evaporators, not shown, and sent to a heavy liquor storage tank 10. From the heavy liquor storage tank 10, the concentrated liquor is pumped to a repulper 12 through enclosed conduit 11. Alumina cake from the belt 13 of belt washer 14 drops into the repulper 12 and is mixed with the liquor. A description of how the alumina cake is formed in the belt washer 14 will be given below. The resulting slurry is pumped into a mixer tank 16 through conduit 15. In the mixer tank 16, the liquor and alumina are thoroughly mixed and desired alumina make-up is added from the storage tank 17 by screw conveyor 18 so that a sufficient amount of finely-divided reactive alumina hydrate is mixed with the liquor to react with the sodium content thereof for the ultimate formation of sodium aluminate as the reaction product.

From the mixing tank 16, the slurry is pumped through conduit 20 into a pelletizer or pellet forming apparatus 21.

Figure 2:
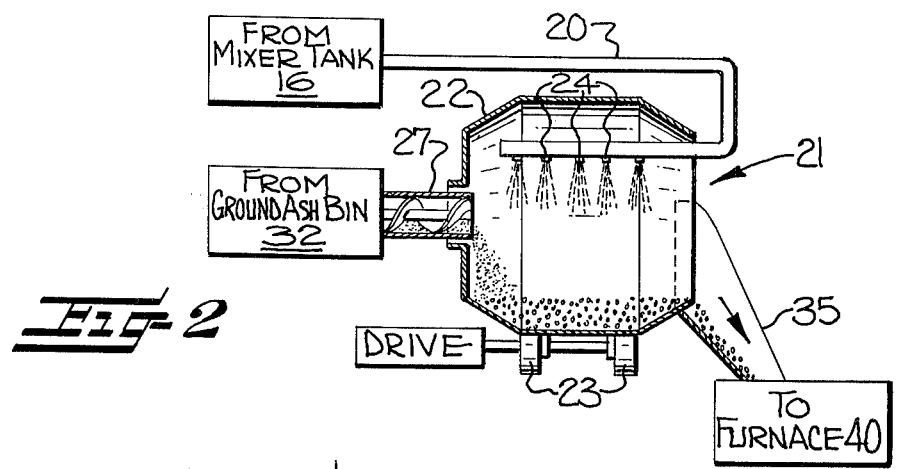
FIG. 2 is a schematic, diagrammatic view of the pellet forming apparatus utilized in this invention.

The pelletizer 21, as may be seen more particularly in FIG. 2, comprises an enclosed hollow housing 22 which is mounted for rotation on any suitable driving apparatus 23. The conduit 20 extends into and longitudinally through the housing 22 and includes a plurality of spray nozzles 24 or other suitable devices for spraying the concentrated liquor-aluminum hydrate slurry within the housing 22. Connected in non-rotating arrangement with one end of the housing 22 is a screw conveyor 27 which feeds recycled sodium aluminate furnance ash from an elevator 30, screw conveyor 31 and ground ash bin 32 into the bottom of the enclosed housing 22 of the pelletizer 21 to form a bed of recycled sodium aluminate furnace ash in the bottom of the housing 22. As the housing 22 rotates, the mixture of concentrated liquor-aluminum hydrate slurry sprayed therein will be tumbled with the furnance ash resulting in the formation of more or less round, solid pellets.

The pellets so formed may range in size from about ⅛ inch to 1 inch or more in diameter. The quantity of dry sodium aluminate furnace ash required to form these discrete pellets depends upon the water content of the concentrated liquor used. At 50–60 percent solids equal parts by weight are used. There is an apparent dehydration-hydration reaction between the liquor and the sodium aluminate since considerable heat is involved in the pelletizing step and the pellets are very cohesive and hard in spite of the water content.

The thus formed pellets are then fed by a chute 35 into one end of a reaction furnace 40 which may be any suitable type of inexpensive and simple furnace, such as a rotary kiln, a multihearth furnace, or a moving grate furnace. In fact any type furnace can be utilized that is equipped to discharge a pelleted ash resulting from combustion from the bottom of the discharge end in the case of a rotary kiln. The furnace preferably operates at a temperature below the fusion temperature of sodium aluminate of about 3000° F. so that the reaction mass does not become plastic or sticky at any stage and preferably at a temperature range between 1500° F.–2000° F. to combust the organic portion of the pellets and react the sodium content thereof with the alumina to form additional sodium aluminate as a particulate unfused ash.

Thus, in the combustion process with sulfite spent liquor, a reducing atmosphere is inherently maintained for carrying out the basic reactions regardless of the combustion conditions outside the pellets, as follows, for example:

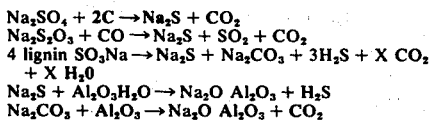

In the oxidizing atmosphere outside of the pellets, the $H_2S$ is oxidized to sulfur dioxide ($SO_2$) and removed in the gas stream:

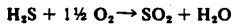

The round pellets retain their form throughout the combustion stage and the collection of the refractory sodium aluminate product as pellets rather than fine ash is simplified and loss in the flue gas is minimized.

The rotary kiln 40 illustrated in FIG. 1 comprises an elongate enclosed chamber 41 which receives the uncombusted pellets at one end thereof from the chute 35 and allows the pellets to flow therethrough by gravity and by rotation of the chamber 41 toward the firing end of the furnace. The firing end of the furnace contains a burner 42 which produces a flame into the chamber 41.

The fully combusted and reacted pellets discharge from the firing end of the furnace 40 down a chute 45 and into an ash cooler 47. Secondary combustion air is drawn from the atmosphere up through the cooler and contacts the burned pellets thus cooling the pellets and preheating the combustion air.

The cooled pellets (250° – 350° F.) pass down a chute 50 into a screw conveyor 51 and flow into an ash bin 53 by a bucket elevator 52. From the ash bin 53 the pellets are fed into a granulator 55 where they are ground to minus 10 mesh and fed by way of a bucket elevator 56 into the ground ash bin 32. As described above, a portion of the thus formed ground sodium aluminate furnace ash is fed from the ground ash bin 32 into the pelletizer 21 for reuse in the treatment process.

Returning to the gas flow through the process and apparatus of this invention, atmospheric air is drawn through the cooler 47 where it contacts and cools the pellets and in turn absorbs heat from them. This preheated air flows from the cooler 47 into the furnace 40 by conduit 60 where it joins hot combustion gases from the burner 42 on the lower or firing end of the furnace 40. These hot gases then meet the unreacted and uncombusted pellets flowing counter-currently through the furnace 40 and cause them to combust and react. The hot gases discharge from the input end of the furnace 40 and into a cyclone 62 where laden dust is separated from the gas stream and returned by conduit 63 to the ground ash bin 32 or the screw conveyor 31 leading therefrom.

The hot gases then flow through conduit 64 into a waste heat boiler 65 where they are cooled to approximately 500° F. and at the same time generate steam for use elsewhere in the process and apparatus. The semi-cooled gases then flow through a conduit 67 into a direct contact gas cooler 68. In the gas cooler 68, the gases are contacted with water which flows from a water supply 70, through conduit 71, through heat exchanger 72 and through conduit 73 into the cooler 68. The water is recycled around and around in the gas cooler and exchanges its heat with fresh water in the heat exchanger 72. Gases are discharged from the gas cooler at about 150° F. through conduit 76.

From the conduit 76, the gases pass through induced draft air fan 77, which originally causes atmospheric air to be drawn in through the cooler 47, and into a conventional absorber 80, a specific example of which is given below.

The absorber 80 illustrated herein comprises an elongate vertically extending hollow housing 81 having packing means in the upper portion of the housing in the form of a plurality of grids of spaced-apart, parallel, generally cylindrical bars extending transversely across the housing 81. Alternate grids of bars 82 extend in opposite directions or at 90° angles to each other so as to form venturi-like passages between the bars 82 and a generally checkerboard arrangement of grids of bars 82. These grids of bars 82 are disposed in generally the upper vertical portion of the enclosed housing 81 of the absorber 80.

Referring again to the ground ash bin 32 another portion, preferably, the remaining portion of the ground sodium aluminate furnace ash, is fed by a screw conveyor 90 and conduit 91 into a dissolver or mixer tank 92 where it is slurried or mixed with water entering the dissolver 92 from conduit 93. This thin slurry consists of dissolved sodium aluminate plus any unreacted alumina and other unsoluble materials that may be present in the ash. The thin slurry is pumped through conduit 95 to a precipitator tank 140. the precipitator tank 140 is connected to the base of the absorber 80 by an open pipe 141 in such a manner that the liquid levels in the base of the absorber and in the precipitator tank are the same. Agitation of the liquid in the base of the absorber and in the precipitator tank is maintained by respective mixers 142.

Precipitated slurry present in the base of the absorber 80 is withdrawn through conduit 143 and recycled to the top of the absorber while a portion of the recycled slurry is diverted through conduit 144 and directed into the precipitator tank 140 to be mixed with the thin slurry containing dissolved sodium aluminate from the dissolver tank 92. By suitable adjustment of a valve 145 in the conduit 144, the streams are mixed in the precipitator tank in the following preferred ratios: between one and four parts (by volume) of precipitated slurry from the base of the absorber to one part (by volume) of the thin slurry containing sodium aluminate solution from the dissolver tank 92, and most desirably at a ratio of about two to one.

When these two streams are so mixed, with agitation, gradual precipitation of hydrated alumina is initiated. The contents of the precipitator tank 140 flows into the base of absorber 80 through the open pipe 141 connecting the two vessels. The rate of flow of the mixture from the precipitator tank to the base of the absorber is regulated by the rate of removal of the precipitated slurry from the base of the absorber through conduit 100 to the belt washer surge tank 101 and the rate of recycled precipitated slurry directed through conduit 144 to the precipitator tank.

Figure 3:
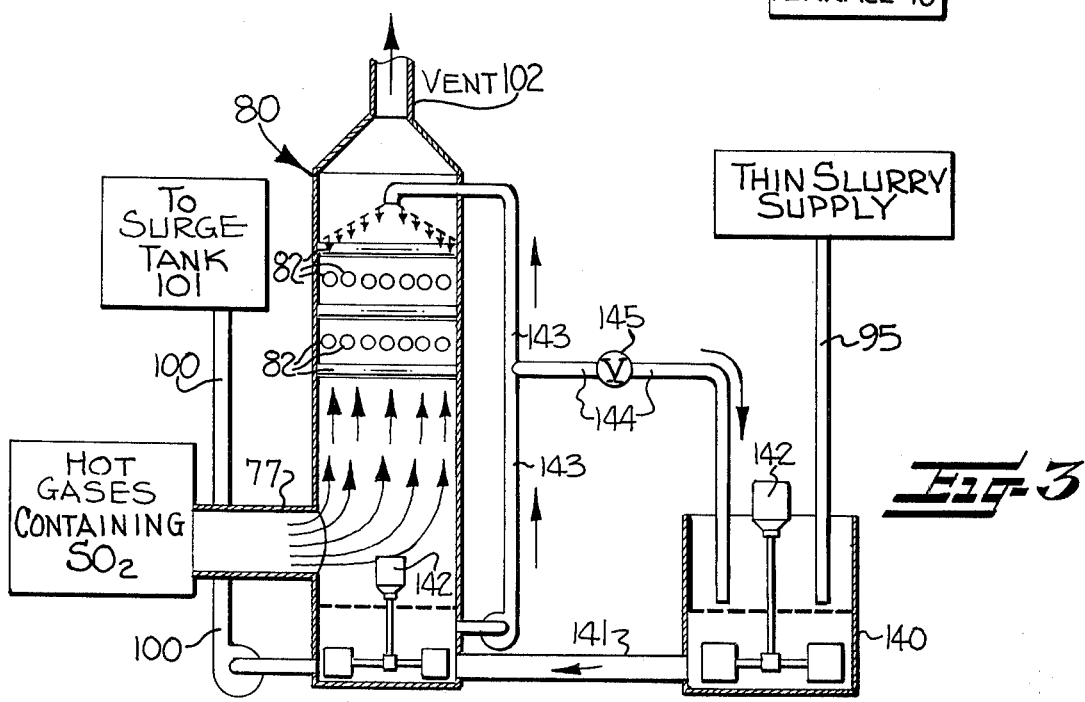
FIG. 3 is a schematic, diagrammatic view of the absorber apparatus and precipitator tank utilized in this invention.
Figure 4:
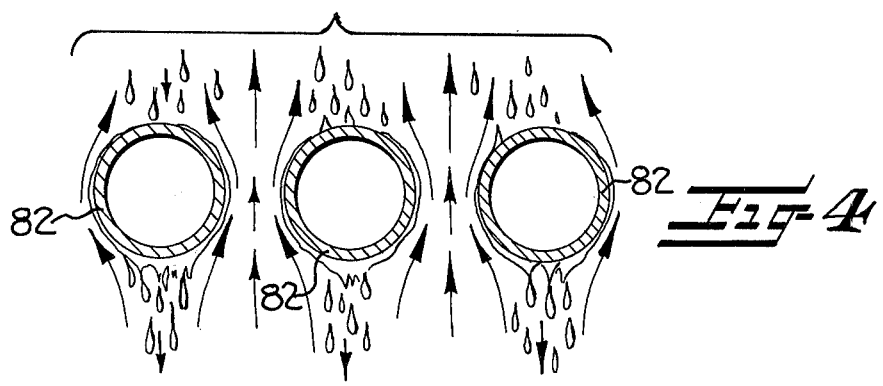
FIG. 4 is an enlarged partial view of a portion of the interior of the absorber apparatus of FIG. 3.

When the mixture of slurry and sodium aluminate solution from the precipitator tank in introduced into the base of the absorber and mixed with the precipitated slurry therein, further precipitation of hydrated alumina occurs. The precipitated slurry from the base of the absorber is pumped along conduit 143 to the top of the absorber wherein it is allowed to flow down over the grids of bars 82, as shown more particularly in FIGS. 3 and 4, to meet the incoming cooled gases that enters at the bottom of the absorber. The sodium aluminate present in the slurry reacts with and absorbs the sulfur dioxide from the gas stream to form sodium sulfite and to further precipitate alumina in an easily separable particulate form according to the chemical reaction:

$$Na_2Al_2O_4 + SO_2 + 3H_2O \rightarrow 2Al(OH)_3 + Na_2SO_3.$$

These materials are returned to the base of the absorber and mixed with the slurry present there while a portion of the slurry is withdrawn from the base of the absorber and pumped through conduit 100 into the belt washer surge tank 101. The scrubbed flue gas is vented to the atmosphere through vents 102 in the top of the absorber 80.

The slurry in the base of the absorber is recycled through the upper portion of the absorber at a rate (e.g. 600 to 800 g.p.m.) which is substantially greater than the rate at which the material from the precipitator tank enters the base of the absorber or the rate at which the slurry from the base of the absorber is withdrawn through conduit 100. Thus, a large quantity of the slurry from the base of the absorber is constantly being recirculated through the upper portion of the absorber for reacting with and absorbing the flue gases passing therethrough. The materials returning to the base of the absorber are effectively mixed with the slurry already present therein as a result of the high rate of recirculation as well as the agitation provided by mixer 142.

The pH of the slurry in the base of the absorber is normally within the range of about 8.0 to 9.5, while the pH of the sodium aluminate solution from the dissolver is about 11 to 13. The recycling of slurry from the base of the absorber to the precipitator tank in preferably maintained so that the pH in the precipitator tank is about 10 to 11.

The slurry flows from the surge tank 101 through conduit 103 into the belt washer filter apparatus 14. The belt 13 rotating through the belt washer 14 filters out the alumina hydrate as a dense cake and drops it into the repulper 12 for subsequent reuse in the treatment process. The sodium sulfite solution passes through the belt 13, through conduit 105 and into a vacuum receiver 106. From the vacuum receiver 106, the sodium sulfite solution is pumped into sodium sulfite storage tank 110 through conduit 109 for subsequent use in the pulp mill and the pulping processes.

The belt 13 of the belt washer 14 is continuously backwashed by water from the belt wash tank 115. In the belt wash tank, water for use in back washing the belt 13 is trapped in a trough 116 and is pumped through conduit 117 onto the belt 13. The contaminated water from the lower part of the belt wash tank 115 is pumped to the mixer 92 through 93 for use in making up the thin slurry in mixer 92. This results in recovery of any alumina cake that is back washed from the belt 13. Water from the belt 13 flows into the belt wash tank 115 through conduit 120.

Contaminated water from the gas cooler 68 overflows from the base of the cooler through conduit 122 and into a cake wash tank 123. Water from the cake wash tank 123 is pumped to the sprayers 125 by conduit 124 for spraying water on the belt 13 of the belt washer 14 to completely wash the sodium sulfite solution from the alumina cake. Any dust that is collected in the contaminated water is recovered and added to the cake and the dissolved sulfur dioxide is absorbed by the sodium sulfite solution and is also recovered. Heated water from the heat exchanger 72 is used for supplying hot make-up water through conduit 130 to both the cake wash tank 123 and the belt wash tank 115.

It may be desirable in some installations to remove additional moisture from the alumina cake from belt washer 14 prior to mixing with the heavy liquor from tank 10. This may be accomplished, for example, by passing the alumina cake from the belt washer 14 through a suitable drying apparatus (not shown) prior to mixing with the heavy liquor. Since less moisture is present in the alumina hydrate, the heavy liquor employed may be less concentrated.

It has also been determined that in many applications it may not be necessary to first form a slurry of the liquor and alumina hydrate prior to mixing with the furnace ash for pellet formation. The filter cake may be introduced directly into the pelletizer 22 and there mixed with the recycled furnace ash and concentrated liquor, or the filter cake may be introduced into cooler 47, where it is mixed with the furnace ash while additional drying of the filter cake takes place. The mixture of ash and alumina hydrate is then mixed with the concentrated liquor in the pelletizer 21 to form pellets therefrom.

This invention is not limited to the processing of spent liquor from pulp and paper operations. The concept can be applied to effluent streams from many processes, with or without sulfur compounds but which contain monovalent metals in the sodium or potassium family. The product could consist of sulfites, carbonates, sulfates, sulfides, or mixtures of these or other salts.

A straightforward example is the production of sodium sulfite from sodium sulfate. In power gas scrubbing systems and in oil refinery scrubbing systems, sulfur dioxide is scrubbed with normal sodium sulfite and produces the bisulfite. During this absorption there is considerable oxidation to the sulfate. The recovery process of the present invention may be used to recover the sulfite directly from the sulfate for additional scrubbing capacity. A certain amount of carbon must be present to bring about a reduction to sulfide and for combustion. This carbon content may be provided as needed from readily available sources, as for example, by the introduction of coke.

The present invention may also be employed with high sulfidity materials to generate sodium bisulfite instead of normal sulfite with minimization of thiosulfate or collodial sulfur formation. This process can also be used for the primary production of sulfuric acid by catalytic oxidation of the sulfur gas stream from the reactor. Ash from the process can be converted to sodium hydroxide by adding a causticization step.

Many industries which make organic chemicals have a waste stream of the sodium or potassium salts of organic acids. Sometimes these streams are highly alkaline and are neutralized with a mineral acid, usually sulfuric. These streams, if processed without neutralization can be used to regenerate the sodium as carbonate or sodium hydroxide in a second step. If neutralized, they can be used to generate carbonate, sulfite, sulfide or combinations or salts. The streams are processed just as in the examples cited.

In accordance with the above general description of the process and apparatus of this invention, the following are illustrative, non-limiting, specific examples:

EXAMPLE 1

69,500 pounds per hour of 10% solids spent sulfite liquor is concentrated in suitable multiple effect evaporators to 13,540 pounds per hour of 51% concentrated liquor containing 1,330 pounds of sodium as $Na_2O$ and 313 pounds of sulfur. The concentrated liquor is fed through repulper 12 and mixer 16 where it is intimately mixed with 4,860 pounds per hour of recycled precipitated aluminum hydrate filter cake containing 2,920 pounds per hour of aluminum hydroxide, $Al(OH)_3$. This mixture is fed to pelletizer 21 along with 16,460 pounds per hour of recycled sodium aluminate kiln ash from the ground ash bin 32. In the pelletizer, the recycled ash forms more or less round solid pellets with the concentrated liquor-aluminum hydrate mixture. The pellets are continuously fed from the pelletizer into the direct-fired rotary kiln 40 where the pellets are combusted at a temperature of 1700° to 1800° F. The resulting combustion ash at the rate of 22,260 pounds per hour is cooled in the cooler 47 by the counter-current draft air. 16,460 pounds per hour of the ash is recycled continuously into the granulator 55, through the ash bin 32 and back into the pelletizer 21. 5,800 pounds per hour of the kiln ash is fed to the dissolver mixer 92 where 14,560 pounds per hour of water are added to form a 20 percent solution of sodium aluminate. This solution is fed to the absorber 80. Hot flue gases from the rotary kiln 41 containing water vapor, $SO_2$, $CO_2$, etc., are fed through cyclone 62 where ash fines are precipitated and carried into the conveyor 31 from the ground ash bin 32. From the cyclone 20, the hot gases are carried through waste heat boiler 65 where heat is exchanged with water to generate 15,000 pounds per hour of 150 PSIG steam for use in the evaporators. The exit gases from the waste heat boiler 65 at a temperature of 450° – 500° F. are carried through line 25 to the gas cooler 68 where cooling water is introduced. The cooled gases containing 626 pounds per hour of $SO_2$ and a large excess of $CO_2$ are carried into absorber 80 and are brought into counter-current contact with slurry from the absorber base which is being recirculated continuously at a rate of 600 g.p.m. and has a pH value of 8.5. The entering (feed) solution (sodium aluminate) at 30 g.p.m. is fed to the precipitator tank where it is mixed with slurry recycled from the absorber base being fed into the precipitator tank at a rate of about 60 g.p.m. to maintain the pH value in the precipitator tank at a value of 10. A pH gradient is thus established which results in a gradual precipitation of aluminum hydrate and produces a particle size which is easy to filter. Discharge slurry is removed from the absorber base at 30 g.p.m. The discharge slurry has a pH of 8.5 and contains 1,200 pounds per hour of sodium sulfite and 1,250 pounds per hour of sodium carbonate in solution and insoluble aluminum hydrate as a slurry. The slurry is carried to the belt filter washer 14 where filter cake of aluminum hydrate is removed and dropped into the repulper 12. The filtrate containing 1,200 pounds per hour of sodium sulfite 1,250 pounds per hour of sodium carbonate and a small amount of sodium sulfide is carried to pulp plant chemical storage 110.

EXAMPLE 2

83,000 pounds per hour of 10 percent solids soda pulp black liquor is concentrated in suitable multiple effect evaporators to 14,000 pounds per hour of 60 percent solids black liquor containing 3,000 pounds per hour of spent caustic soda. The concentrated liquor is fed through repulper 12 and mixer tank 16 where it is intimately mixed with 10,000 pounds per hour of freshly precipitated aluminum hydrate filter cake containing 6,000 pounds of aluminum hydroxide $Al(OH)_3$. This mixture is fed to the pelletizer 21 where it is sprayed onto and tumbled with 14,000 pounds per hour of recycled sodium aluminate ash from the ground ash bin 32.

In the pelletizer 21, the recycled ash forms more or less round, solid pellets with the concentrated liquor-aluminum hydrate mixture. The pellets are continuously fed from the pelletizer into a direct-fired rotary kiln 40 where the pellets are combusted at a temperature of about 1800° F. The resulting combustion ash at a rate of 20,200 pounds per hour is cooled in the cooler 47 by counter-current draft air 14,000 pounds per hour of kiln ash is recycled continuously through the granulator 53 and ground ash bin 32 back into the pelletizer 21. 6,200 pounds per hour of kiln ash is fed through dissolver mixer 92 where water is added to form a 20 percent solution of sodium aluminate. This solution is fed to absorber 80. Hot flue gases from the kiln 40 are exhausted through a cyclone 62 where ash fines are precipitated and can be carried into the dissolver mixer 92 or put in the ground ash recycle screw 31.

From the cyclone 62, the hot gases are carried to and through the waste heat boiler 65 where heat is exchanged with water to generate 23,000 pounds per hour of evaporator processed steam. The exit gases from the boiler 65 at a temperature of 450° – 500° F. are carried to the gas cooler 68 and the cooled gases containing a large excess of $CO_2$ are carried into the absorber 80 and brought into contact countercurrently with slurry from the absorber base which is being recirculated through the absorber at a rate of 750 g.p.m. and has a pH value of 8.6. The entering feed solution of sodium aluminate at 20% solids and containing 6,200 pounds per hour of sodium aluminate is fed to the precipitator tank. Slurry from the base of the absorber is fed into the precipitator tank at a rate sufficient to maintain the pH in the precipitator tank at a value of 10.2. A pH gradient is thus established which produces an alumina hydrate particle with good filtering and dewatering properties. The discharge volume from the absorber base is approximately equal to the feed flow. The discharge slurry contains 4,000 pounds per hour of soda ash ($Na_2CO_3$) and sodium bicarbonate ($NaHCO_3$) in solution and aluminum hydrate is precipitated as a slurry. The slurry is carried through surge tank 101 into the belt washer 14 where the aluminum hydrate filter cake is removed and carried into the repulper 12. The filtrate from the belt washer 14 is fed to storage or chemically processed in any desired manner, such as causticizing, for subsequent use in the mill pulping operation.

EXAMPLE 3

Same as Example 1 except that, if only sodium sulfite is desired as the final pulp chemical product, 380 pounds per hour of elemental sulfur is fed to the rotary kiln 40 for combustion along with the pellets to provide the needed amount of $SO_2$ to react with all of the sodium content of the liquor preferential to reaction with $CO_2$.

EXAMPLE 4

Same as Example 1, except that the spent sulfite liquor to be processed has been modified to a raffinate resulting from the acidification of concentrated spent NSSC liquor with sulfuric acid stoichiometric to the sodium acetate and formate content followed by solvent extraction of the liberated acetic and formic acids with 2-butanone, as disclosed in U.S. Pat. No. 2,714,118, to form an extract and a raffinate, stripping the 2-butanone from the raffinate followed by additional raffinate concentration to 50–60 percent solids prior to mixing with aluminum hydrate and pelletizing with sodium aluminate ash for combustion in the rotary kiln. In this case, the sulfur added to the raffinate by the sulfuric acid used in the acidification provides enough additional to convert essentially all of the sodium content of the spent liquor to sodium sulfite.

EXAMPLE 5

An effluent containing 10,000 pounds per hour of potassium salts of mixed organic acids at 20% solids is concentrated to a stream of 3,330 pounds per hour at 60% solids. The potassium content of the solids is 40% or 800 pounds per hour. This concentrated stream is mixed with 1,600 pounds of dry aluminum hydroxide, the latter having been recovered from the filter at 40% solids and dried using heat from the process. This mixture is fed to the pelletizer with 1,700 pounds per hour of recycled sodium aluminate. This feed mixture is fed through the reactor with the same reactions as in Example 2 yielding potassium salts instead of sodium. The discharge product slurry contains 1,400 pounds per hour of potassium carbonate at 20% solids. This can be causticized to give the hydroxide or processed chemically in any other desired manner.

In the drawings and specification, there has been set forth a preferred embodiment of the invention, and although specific terms are employed, they are used in a generic and descriptive sense only and not for purposes of limitation.

That which is claimed is:

1. A continuous process for recovering the alkali metal content of alkali-metal containing waste liquor, said process being particularly suited for the recovery of sodium or potassium from the spent liquor from pulping operations, and comprising the steps of:
   a. mixing concentrated alkali metal-containing waste liquor with alumina in an amount necessary to react with the alkali metal content of the liquor for the ultimate formation of an alkali metal aluminate as the reaction product, and with alkali metal aluminate furnace ash;
   b. forming the mixture of waste liquor, alumina, and alkali metal aluminate furnace ash into solid pellets;
   c. subjecting the solid pellets to a temperature below the fusion temperature of the alkali metal aluminate while combusting the organic content of the pellets and while reacting the alkali metal content thereof with the alumina to form alkali metal aluminate ash;
   d. pulverizing the alkali metal aluminate furnace ash and recycling a portion thereof for reuse in step (a);
   e. dissolving another portion of the alkali metal aluminate furnace ash in water to form a solution of alkali metal aluminate;
   f. mixing the alkali metal aluminate solution with slurry to initiate limited precipitation of alumina from the solution of alkali metal aluminate, the slurry having been produced by reacting a solution of alkali metal aluminate with an acidic oxide gas,
   g. reacting the thus formed mixture of slurry and alkali metal aluminate solution with an acidic oxide gas to effect additional precipitation of alumina in the form of easily filterable particles and produce a slurry of the alumina in a solution containing the alkali metal,
   h. recycling a portion of the thus formed slurry for use in step (f); and
   i. separating from the thus formed slurry the insoluble alumina for reuse in step (a) and the solution of alkali metal for recovery of the alkali metal content thereof.

2. The process according to claim 1 wherein the combusting and reacting of the pellets includes producing flue gases containing acidic oxide gas, and wherein the step of reacting the mixture of slurry and alkali metal aluminate with an acidic oxide gas comprises withdrawing flue gases containing acidic oxide gas from the furnace employed for combusting and reacting of the pellets and feeding the flue gases into and through an absorption column while directing the slurry and alkali metal aluminate mixture through the absorption column and contacting the same with the flue gases passing therethrough.

3. The process according to claim 1 wherein the step of reacting the mixture of slurry and alkali metal aluminate solution with an acidic oxide gas comprises feeding an acidic oxide gas into and through an absorption column while introducing the mixture of slurry and alkali metal aluminate solution into the base of the absorption column and mixing the same with slurry present therein to effect additional precipitation of alumina and while also withdrawing slurry from the base of the absorption column and contacting the same with the acidic oxide gas passing through the absorption column to effect still further precipitation of alumina and returning the same to the base of the absorption column.

4. The process according to claim 3 wherein the rate at which slurry is withdrawn from the base of the absorption column and contacted with the gases passing through the absorption column is substantially higher than the rate at which the slurry and alkali metal aluminate mixture is introduced into the absorption column.

5. The process according to claim 1 wherein the recycled slurry is mixed with the alkali metal aluminate solution at a ratio of about 1 to 4 parts by volume slurry to 1 part by volume sodium aluminate solution.

6. A continuous process for recovering the alkali metal and sulfur content of alkali metal-base sulfite waste liquor, said process being particularly suited for treatment of sodium or potassium base spent liquor from sulfite pulping operations, and comprising the steps of:

a. mixing concentrated alkali metal-base waste liquor containing sulfur and organic components with alumina in an amount necessary to react with the alkali metal content of the liquor for the ultimate formation of an alkali metal aluminate as the reaction product, and with alkali metal aluminate furnace ash;

b. forming the mixture of waste liquor, alumina, and alkali metal aluminate furnace ash into solid pellets;

c. feeding the solid pellets through a furnace operating at a temperature below the fusion temperature of the alkali metal aluminate while combusting the organic content of the pellets and while reacting the alkali metal content thereof with the alumina to form alkali metal aluminate ash, d. pulverizing the alkali metal aluminate furnace ash and recycling a portion thereof for reuse in step (a);

e. dissolving another portion of the pulverized alkali metal aluminate furnace ash in water to form a solution of alkali metal aluminate;

f. withdrawing flue gases containing sulfur dioxide and carbon dioxide from the furnace employed for combusting and reacting of the pellets and feeding the flue gases into and through an absorption column;

g. mixing the alkali metal aluminate solution with slurry from the base of the absorption column to initiate limited precipitation of alumina from the alkali metal aluminate, the slurry having been formed in the absorption column by reacting the solution of alkali metal aluminate with flue gases to effect precipitation of alumina;

h. directing the thus formed mixture of slurry and alkali metal aluminate solution into the base of the absorption column and mixing the same with slurry present therein to effect additional precipitation of alumina while also withdrawing slurry from the base of the absorption column and contacting the same with the flue gases containing sulfur dioxide and carbon dioxide passing through the absorption column to allow the precipitation of alumina to progress to completion and produce a slurry of the alumina in the form of easily filterable particles in a solution containing alkali metal sulfite and alkali metal carbonate, and/or bicarbonate, and returning the slurry to the base of the absorption column;

i. filtering the slurry to separate the insoluble alumina for reuse in step (a) and the solution containing alkali metal sulfite and alkali metal carbonate and/or bicarbonate for recovery of the alkali metal content thereof.

7. A continuous process for recovering of the sodium content of the sodium-base waste liquor, said process being particularly suited for the recovery of sodium from the spent liquor from pulping operations, and comprising the steps of:

a. mixing concentrated sodium-base waste liquor with alumina in an amount necessary to react with the sodium content of the liquor for the ultimate formation of sodium aluminate as the reaction product;

b. mixing the concentrated liquor and alumina mixture with sodium aluminate furnace ash and forming solid pellets thereof;

c. feeding the solid pellets through a furnace operating at a temperature below the fusion temperature of the sodium aluminate while combusting the organic content of the pellets and while reacting the sodium content thereof with the alumina to form sodium aluminate ash;

d. pulverizing the sodium aluminate furnace ash and recycling a portion thereof for reuse in step (b);

e. dissolving another portion of the pulverized sodium aluminate furnace ash in water to form a solution of sodium aluminate;

f. mixing the sodium aluminate solution with slurry to initiate limited precipitation of alumina from the sodium aluminate, the slurry having been formed by reacting the solution of sodium aluminate with sulfur dioxide to effect precipitation of alumina, g. reacting the mixture of slurry and sodium aluminate with sulfur dioxide to effect additional precipitation of alumina and produce a slurry of the alumina in the form of easily filterable particles in a solution containing sodium sulfite;

h. recycling a portion of the thus formed slurry for use in step (f); and i. separating from the thus formed slurry the insoluble alumina for reuse in step (a) and the sodium sulfite for recovery of the sodium and sulfur content thereof.

8. The process according to claim 7 wherein the step of reacting the mixture of slurry and sodium aluminate with sulfur dioxide comprises withdrawing flue gases containing sulfur dioxide from the furnace employed for combusting and reacting of the pellets and feeding the flue gases into and through an absorption column, introducing the slurry and sodium aluminate mixture into the base of the absorption column and mixing the same with slurry present therein to effect additional precipitation of alumina, withdrawing slurry from the base of the absorption column and recycling a portion thereof to the upper portion of the absorption column and into contact with the flue gases passing through the absorption column to effect still further precipitation of alumina, and recycling another portion of the slurry withdrawn from the base of the absorption column for use in mixing with the sodium aluminate solution.

9. An apparatus for recovering the alkali metal content of alkali metal-containing waste liquor, said apparatus being particularly suited for the recovery of sodium or potassium from the spent liquor from pulping operations, and said apparatus comprising:

means for mixing concentrated alkali metal-base spent liquor with alumina in an amount necessary to react with the alkali metal content of the liquor for the ultimate formation of an alkali metal aluminate as the reaction product;

means for forming solid pellets from the concentrated liquor and alumina mixture by mixing the same with alkali metal aluminate furnace ash;

furnace means for receiving the solid pellets and combusting and reacting the same, said furnace means operating at a temperature below the fusion temperature of the alkali metal aluminate and at a sufficiently high temperature to combust the organic portion of the pellets and react the alkali metal content thereof with alumina to form alkali metal aluminate ash;

pulverizing means for receiving the ash from said furnace means and for pulverizing the same for subsequent reuse in the treating process;

means for recycling a portion of the pulverized ash to the pellet forming means for use in the formation of solid pellets thereof;

means for receiving another portion of the pulverized furnace ash and dissolving the same in water to form a solution of alkali metal aluminate;

a mixing vessel for receiving the alkali metal aluminate solution and mixing the same with slurry to initiate limited precipitation of alumina from the alkali metal aluminate, the slurry having been produced by reacting a solution of alkali metal aluminate with an acidic oxide gas to effect precipitation of alumina;

reactor means for receiving the mixture from said mixing vessel and reacting the same with an acidic oxide gas to effect additional precipitation of alumina and produce a slurry of the alumina in the form of easily filterable particles in a solution containing the alkali metal;

means for recycling a portion of the slurry from the reactor means to said mixing vessel for being mixed with the alkali metal aluminate solution; and means for separating from the slurry the alumina for reuse in the mixing means and the solution of alkali metal for recovery of the alkali metal content thereof.

10. The apparatus according to claim 9 wherein said reactor means comprises an absorption column having means for receiving gases through an upper portion thereof, means in the base portion thereof for receiving the mixture from said mixing vessel for being mixed with slurry present therein to achieve additional precipitation of alumina, and means for recycling slurry from the base portion of the absorber to the upper portion thereof and into contact with the gases passing therethrough to react with the gases and allow the precipitation of alumina to progress to completion.

11. The apparatus according to claim 10 wherein said means for recycling slurry from the base portion of the absorber to the upper portion thereof includes pump means operable for recycling the slurry at a substantially greater rate than the rate at which the mixture is received from said mixing vessel.

12. An apparatus for recovering the alkali metal content of alkali metal-containing waste liquor, said apparatus being particularly suited for the recovery of sodium or potassium from the spent liquor from pulping operations, and said apparatus comprising:

means for mixing concentrated alkali metal base spent liquor with alumina in an amount necessary to react with the alkali metal content of the liquor for the ultimate formation of an alkali metal aluminate as the reaction product;

means for forming solid pellets from the concentrated liquor and alumina mixture by mixing the same with alkali metal aluminate furnace ash;

furnace means for receiving the solid pellets and combusting and reacting the same, said furnace means operating at a temperature below the fusion temperature of the alkali metal aluminate and at a sufficiently high temperature to combust the organic portion of the pellets and react the alkali metal content thereof with alumina to form alkali metal aluminate ash;

pulverizing means for receiving the ash from said furnace means and for pulverizing the same for subsequent reuse in the treating process;

means for recycling a portion of the pulverized ash to the pellet forming means for use in the formation of solid pellets thereof;

means for receiving another portion of the pulverized furnace ash and dissolving the same in water to form a solution of alkali metal aluminate;

a mixing vessel for receiving the alkali metal aluminate solution and mixing the same with slurry to initiate limited precipitation of alumina from the alkali metal aluminate;

an absorption column having an elongate vertically extending hollow housing and having packing means in an upper portion thereof;

means for withdrawing flue gases from said furnace means and for directing the same into and through said absorption column and across said packing means;

a conduit communicatively interconnecting the base portion of said mixing vessel with the base portion of said absorption column for conveying the contents of the mixing vessel into the absorption column;

means in the base portion of the absorption column for effecting mixing of said contents of the mixing vessel upon being introduced into the base of the column with slurry already present in the base of the column to achieve additional precipitation of alumina;

means for withdrawing slurry from the base of the absorption column and for recycling a portion thereof to the upper portion of the column and downwardly over the packing means and into contact with the flue gases passing through the column to react therewith and achieve further precipitation of alumina;

means for recycling another portion of the slurry withdrawn from the base of the absorption column to the said mixing vessel for being mixed with the alkali metal aluminate solution therein; and means for receiving slurry withdrawn from the base of the absorber and separating the alumina for reuse in mixing with concentrated spent liquor and the solution of alkali metal for recovery of the alkali metal content thereof.

* * * * *